(12) United States Patent
Marshall et al.

(10) Patent No.: US 9,584,437 B2
(45) Date of Patent: *Feb. 28, 2017

(54) RESOURCE WATERMARKING AND MANAGEMENT

(71) Applicant: AirWatch LLC, Atlanta, GA (US)

(72) Inventors: John Marshall, Atlanta, GA (US); William DeWeese, Haltom City, TX (US)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,930

(22) Filed: Jun. 2, 2013

(65) Prior Publication Data

US 2013/0275600 A1    Oct. 17, 2013

(51) Int. Cl.
*H04L 12/70* (2013.01)
*H04L 12/923* (2013.01)
*G06F 21/16* (2013.01)

(52) U.S. Cl.
CPC ............ *H04L 47/762* (2013.01); *G06F 21/16* (2013.01)

(58) Field of Classification Search
CPC ................................ H04L 47/762; G06F 21/16
See application file for complete search history.

(56) References Cited

U.S. PATENT DOCUMENTS

| | | | |
|---|---|---|---|
| 4,679,226 A | 7/1987 | Muehleisen | |
| 5,237,614 A | 8/1993 | Weiss | |
| 5,446,888 A | 8/1995 | Pyne | |
| 5,574,786 A | 11/1996 | Dayan et al. | |
| 5,625,869 A | 4/1997 | Nagamatsu et al. | |
| 5,631,947 A | 5/1997 | Wittstein et al. | |
| 5,799,068 A | 8/1998 | Kikinis et al. | |
| 5,826,265 A | 10/1998 | Van Huben et al. | |
| 5,864,683 A | 1/1999 | Boebert et al. | |
| 5,870,459 A | 2/1999 | Phillips et al. | |
| 5,928,329 A | 7/1999 | Clark et al. | |
| 5,961,590 A | 10/1999 | Mendez et al. | |
| 5,966,081 A | 10/1999 | Chesnutt | |
| 5,974,238 A | 10/1999 | Chase, Jr. | |
| 5,987,609 A | 11/1999 | Hasebe | |
| 6,006,332 A | 12/1999 | Rabne et al. | |
| 6,021,492 A | 2/2000 | May | |
| 6,023,708 A | 2/2000 | Mendez et al. | |

(Continued)

FOREIGN PATENT DOCUMENTS

| | | |
|---|---|---|
| CA | 2149337 A1 | 6/1994 |
| GB | 2309860 B | 5/2000 |

(Continued)

OTHER PUBLICATIONS

Asynchrony Software, Inc. "PDA Defense User Guide", 2002.

(Continued)

*Primary Examiner* — Abdullahi E Salad

(57) ABSTRACT

A method, system and non-transitory computer-readable medium product are provided for resource watermarking and management. In the context of a method, a method is provided that includes identifying resources associated with a device and identifying a watermark template. The method further includes associating the watermark template with the resources, and authorizing the device to perform actions on the resources.

19 Claims, 3 Drawing Sheets

(56) References Cited

U.S. PATENT DOCUMENTS

| | | |
|---|---|---|
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,167,253 A | 12/2000 | Farris et al. |
| 6,233,341 B1 | 5/2001 | Riggins |
| 6,269,369 B1 | 7/2001 | Robertson |
| 6,463,470 B1 | 10/2002 | Mohaban et al. |
| 6,480,096 B1 | 11/2002 | Gutman et al. |
| 6,560,772 B1 | 5/2003 | Slinger |
| 6,606,662 B2 | 8/2003 | Nagasaki |
| 6,636,489 B1 | 10/2003 | Fingerhut |
| 6,668,322 B1 | 12/2003 | Wood et al. |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,017,105 B2 | 3/2006 | Flanagin et al. |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,480,907 B1 | 1/2009 | Marolia et al. |
| 7,496,847 B2 | 2/2009 | Koehane et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,689,532 B1* | 3/2010 | Levy .............. 713/176 |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,873,959 B2 | 1/2011 | Zhu et al. |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 9/2011 | Piernot et al. |
| 8,012,219 B2 | 9/2011 | Mendez et al. |
| 8,041,776 B2 | 10/2011 | Friedman et al. |
| 8,046,823 B1 | 10/2011 | Begen et al. |
| 8,046,863 B2 | 11/2011 | Berti et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,099,332 B2 | 1/2012 | Lemay et al. |
| 8,117,344 B2 | 2/2012 | Mendez et al. |
| 8,150,431 B2 | 4/2012 | Wolovitz et al. |
| 8,166,106 B2 | 4/2012 | Biggs et al. |
| 8,171,389 B2 | 5/2012 | Wang et al. |
| 8,225,381 B2 | 7/2012 | Lemke |
| 8,359,016 B2 | 1/2013 | Lindeman et al. |
| 8,433,620 B2 | 4/2013 | Futty et al. |
| 8,504,831 B2 | 8/2013 | Pratt et al. |
| 8,613,048 B2 | 12/2013 | Braddy et al. |
| 2001/0023421 A1* | 9/2001 | Numao et al. ............ 707/9 |
| 2002/0012443 A1 | 1/2002 | Rhoads et al. |
| 2002/0013721 A1 | 1/2002 | Dabbiere et al. |
| 2002/0049644 A1 | 4/2002 | Kargman |
| 2002/0055967 A1 | 5/2002 | Coussement |
| 2002/0098840 A1 | 7/2002 | Hanson et al. |
| 2003/0065934 A1 | 4/2003 | Angelo et al. |
| 2003/0110084 A1 | 6/2003 | Eberhard et al. |
| 2003/0172166 A1 | 9/2003 | Judge et al. |
| 2003/0186689 A1 | 10/2003 | Herle et al. |
| 2003/0187798 A1 | 10/2003 | McKinley et al. |
| 2003/0204716 A1 | 10/2003 | Rockwood et al. |
| 2004/0098715 A1 | 5/2004 | Aghera et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0003804 A1 | 1/2005 | Huomo et al. |
| 2005/0021967 A1 | 1/2005 | Bruekers et al. |
| 2005/0021980 A1 | 1/2005 | Kanai |
| 2005/0071748 A1 | 3/2005 | Shipp |
| 2005/0246192 A1 | 11/2005 | Jauffred et al. |
| 2006/0190984 A1 | 8/2006 | Heard et al. |
| 2006/0203815 A1* | 9/2006 | Couillard ............ 370/389 |
| 2007/0016613 A1 | 1/2007 | Foresti et al. |
| 2007/0033397 A1 | 2/2007 | Phillips, II et al. |
| 2007/0093243 A1 | 4/2007 | Kapadekar et al. |
| 2007/0136492 A1 | 6/2007 | Blum et al. |
| 2007/0143603 A1* | 6/2007 | Hadden .......... G06F 21/608 713/167 |
| 2007/0147656 A1* | 6/2007 | Browning ............ 382/100 |
| 2007/0156897 A1 | 7/2007 | Lim |
| 2007/0174433 A1 | 7/2007 | Mendez et al. |
| 2007/0192588 A1 | 8/2007 | Roskind et al. |
| 2007/0260883 A1 | 11/2007 | Giobbi et al. |
| 2007/0261099 A1 | 11/2007 | Broussard et al. |
| 2007/0288637 A1 | 12/2007 | Layton et al. |
| 2008/0051076 A1 | 2/2008 | O'Shaughnessy et al. |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2008/0244695 A1 | 10/2008 | Lee et al. |
| 2009/0036111 A1 | 2/2009 | Danford et al. |
| 2009/0144632 A1 | 6/2009 | Mendez |
| 2009/0158318 A1* | 6/2009 | Levy ................ 725/32 |
| 2009/0198997 A1 | 8/2009 | Yeap et al. |
| 2009/0228592 A1* | 9/2009 | Snyder ............ G06F 21/16 709/226 |
| 2009/0253410 A1 | 10/2009 | Fitzgerald et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |

(56) References Cited

U.S. PATENT DOCUMENTS

| | | | |
|---|---|---|---|
| 2010/0005157 | A1 | 1/2010 | Mendez et al. |
| 2010/0005159 | A1 | 1/2010 | Ishiguro |
| 2010/0005195 | A1 | 1/2010 | Mendez et al. |
| 2010/0023630 | A1 | 1/2010 | Mendez et al. |
| 2010/0100641 | A1 | 4/2010 | Quinlan et al. |
| 2010/0120450 | A1 | 5/2010 | Herz |
| 2010/0144323 | A1 | 6/2010 | Collins et al. |
| 2010/0146269 | A1 | 6/2010 | Baskaran |
| 2010/0254410 | A1 | 10/2010 | Collins |
| 2010/0268844 | A1 | 10/2010 | Quinlan et al. |
| 2010/0273456 | A1 | 10/2010 | Wolovitz et al. |
| 2010/0299152 | A1 | 11/2010 | Batchu et al. |
| 2010/0299362 | A1 | 11/2010 | Osmond |
| 2010/0299376 | A1 | 11/2010 | Batchu et al. |
| 2010/0299719 | A1 | 11/2010 | Burks et al. |
| 2010/0325649 | A1* | 12/2010 | Anguiano ............... 725/25 |
| 2011/0004941 | A1 | 1/2011 | Mendez et al. |
| 2011/0082900 | A1 | 4/2011 | Nagpal et al. |
| 2011/0113062 | A1 | 5/2011 | Quinlan et al. |
| 2011/0145932 | A1 | 6/2011 | Nerger et al. |
| 2011/0153779 | A1 | 6/2011 | Mendez et al. |
| 2011/0153799 | A1 | 6/2011 | Ito |
| 2011/0167474 | A1 | 7/2011 | Sinha et al. |
| 2011/0202589 | A1 | 8/2011 | Piernot et al. |
| 2011/0225252 | A1 | 9/2011 | Bhat et al. |
| 2011/0270799 | A1 | 11/2011 | Muratov |
| 2011/0276805 | A1 | 11/2011 | Nagpal et al. |
| 2011/0289320 | A1* | 11/2011 | Twitchell, Jr. ......... H04L 63/12 713/176 |
| 2011/0296186 | A1 | 12/2011 | Wong et al. |
| 2011/0314550 | A1* | 12/2011 | Mastrangelo et al. ......... 726/26 |
| 2011/0320552 | A1 | 12/2011 | Friedman et al. |
| 2012/0005578 | A1 | 1/2012 | Hawkins |
| 2012/0015644 | A1 | 1/2012 | Danford et al. |
| 2012/0045089 | A1* | 2/2012 | Ramos et al. ............... 382/100 |
| 2012/0072730 | A1* | 3/2012 | Winograd et al. ........... 713/176 |
| 2012/0102392 | A1 | 4/2012 | Reesman et al. |
| 2012/0198547 | A1 | 8/2012 | Fredette et al. |
| 2012/0204032 | A1 | 8/2012 | Wilkins et al. |
| 2013/0086466 | A1* | 4/2013 | Levy et al. ................. 715/234 |
| 2013/0125196 | A1* | 5/2013 | Shapiro ...................... 726/1 |
| 2013/0152169 | A1 | 6/2013 | Stuntebeck |
| 2013/0152210 | A1* | 6/2013 | Petrovic et al. ............... 726/26 |
| 2013/0198038 | A1* | 8/2013 | Mowatt et al. ............ 705/26.41 |
| 2013/0276062 | A1* | 10/2013 | Sarawat et al. .................. 726/3 |
| 2014/0007246 | A1* | 1/2014 | Nelson et al. ................ 726/26 |

FOREIGN PATENT DOCUMENTS

| | | |
|---|---|---|
| GB | 2346716 A | 8/2000 |
| JP | 07141245 A | 6/1995 |
| JP | 08251660 A | 9/1996 |
| WO | 9704389 A1 | 2/1997 |
| WO | 9922322 A1 | 5/1999 |
| WO | 0241661 A2 | 5/2002 |

OTHER PUBLICATIONS

Belani, Eshwar et al., "The CRISIS Wide Area Security Architecture", 1998.

Benaloh, Josh et al., "Patient Controlled Encryption: Ensuring Privacy of Electronic Medical Records", Nov. 13, 2009.

Do, Khang D., "NFOA in U.S. Appl. No. 13/316,073", Non-Final Office Action Cited in U.S. Appl. No. 13/316,073 dated Jan. 18, 2013, Jan. 18, 2013.

Fox, Armando et al., "Security on the Move: Indirect Authentication Using Kerberos", 1996.

Gong, Li et al., "Multicast Security and Its Extension to a Mobile Environment", Oct. 1995.

Infinite Technologies, "Infinite Interchange", 1997.

Kiiskinen, Jani et al., "Data Channel Service for Wireless Telephone Links", Jan. 1996.

Latedroid, "JuiceDefender", Jan. 15, 2012.

Menaria, Pankaj et al., "Security in Mobile Database Systems", Mar. 17, 2011.

"Nokia 9000i Owners Manual", 1997.

Pfitzmann, Andreas et al., "Mobile User Devices and Security Modules: Design for Trustworthiness", Feb. 5, 1996.

Ratner, David et al., "Replication Requirements in Mobile Environments", Nov. 2001.

Ratner, David H., "Roam: A scalable Replication System for Mobile and Distributed Computing", Jan. 1998.

Research in Motion, "Blackberry Wireless Handheld 5810 Getting Started Guide", Jan. 15, 2003.

Research in Motion, "Blackberry Wireless Handheld 5810 Quick Reference Guide", 2003.

Research in Motion, "Blackberry Wireless Handheld 5810 User Guide", 2003.

Stajano, Frank et al., "The Thinnest of Clients: Controlling It All Via Cellphone", Mobile Computing and Communications Review, vol. 2, No. 4, Oct. 1998.

Steiner, Jennifer, "Kerberos: An Authentication Service for Open Network Systems", Jan. 12, 1988.

Strunk, John et al., "Self-Securing Storage: Protecting Data in Compromised Systems", Symposium on Operating Systems Design and Implementation, 2000.

"MobiLink Synchronization Users Guide", Part No. 38132-01-0800-01, Nov. 2001.

Symantec Corporation, "Creating Norton pcAnywhere Scripts", 1994.

Traveling Software, Inc. "LapLink for Windows 95", 1996.

Wachowicz, Moniza et al., "Combining Location and Data Management in an Environment for Total Mobility", In Proceedings of the International Workshop on Information Visualization and Mobile Computing, 1996.

Xcellenet, Inc. "RemoteWare Client for Windows NT and Windows 95 User's Guide", 1996.

Xcellenet, Inc. "RemoteWare Forms and RemoteWare Query", 1994.

Xcellenet, Inc. "RemoteWare Forms Getting Started Guide", 1994.

Xcellenet, Inc. "RemoteWare Server for Windows NT", 1996.

Xcellenet, Inc. "RemoteWare Server Operations Guide", 1992.

Non-Final Office Action in co-pending, related U.S. Appl. No. 13/907,932 mailed Dec. 10, 2014.

Office Action mailed on Aug. 17, 2015 for U.S. Appl. No. 14/270,231.

Office Action mailed Dec. 7, 2015 for U.S. Appl. No. 14/270,231.

Office Action mailed May 20, 2016 for U.S. Appl. No. 14/270,231.

* cited by examiner

RESOURCE WATERMARKING AND MANAGEMENT

BACKGROUND

Resource Watermarking and Management provides associating watermark templates with resources associated with a device. Additionally, watermarked resource management provides logging events related to watermarked resources. In some situations, devices may seek to perform actions on resources that are not watermarked, which may be problematic as certain resources are sensitive and must not be freely utilized. Conventional approaches address this problem by relying on the user of a device to manually watermark resources before performing actions on the resources.

SUMMARY

This Summary is provided to introduce a selection of concepts in a simplified form that are further described below in the Detailed Description. This Summary is neither intended to identify key features or essential features of the claimed subject matter, nor is this Summary intended to limit the claimed subject matter's scope.

A method, system and non-transitory computer-readable medium product are provided for resource watermarking and management. In the context of a method, a method is provided that includes identifying resources associated with a device and identifying a watermark template. The method further includes associating the watermark template with the resources, and authorizing the device to perform actions on the resources.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
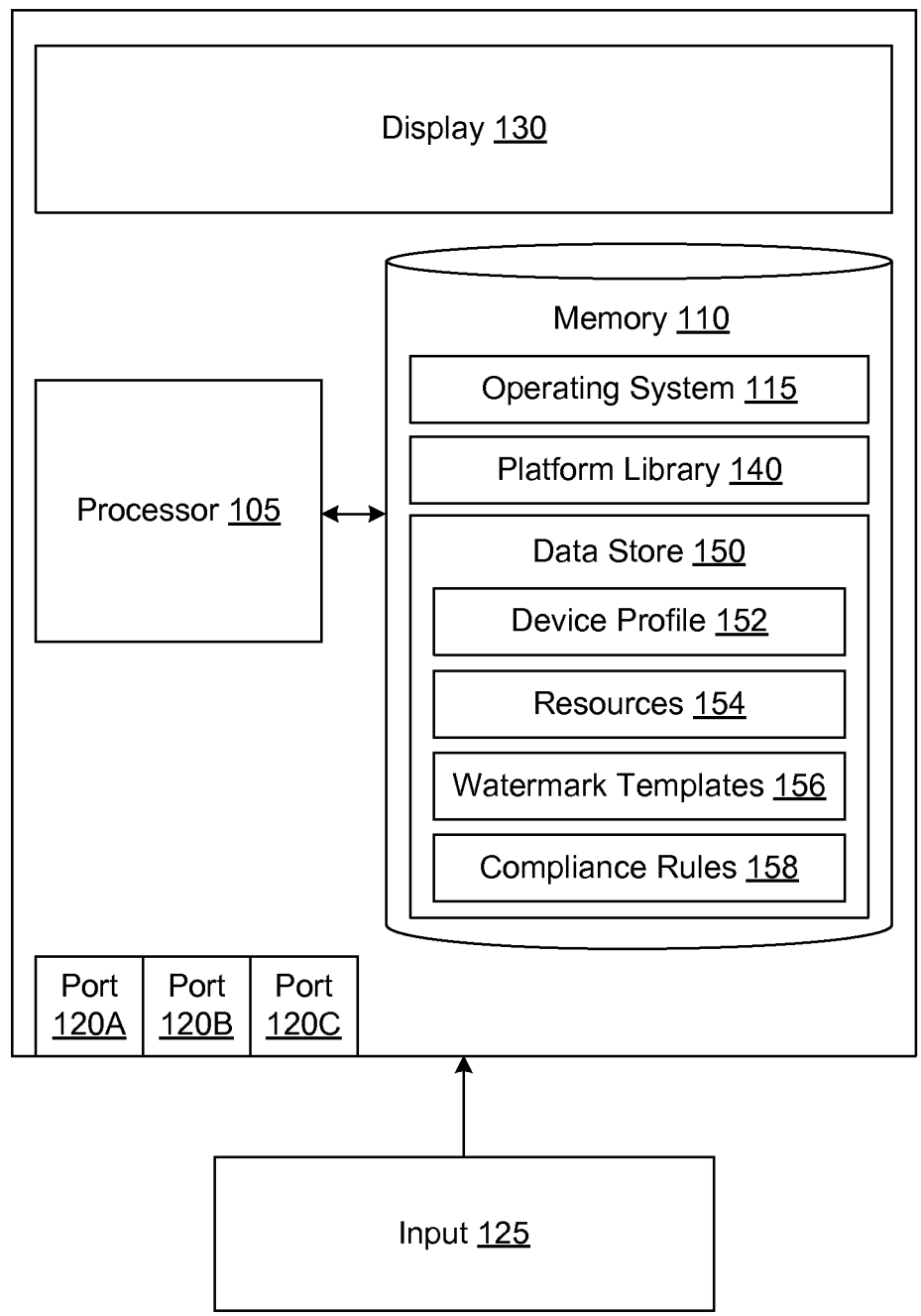
FIG. 1 is a block diagram of a user device.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Resource watermarking and management may be provided. Information Technology (IT) administrators may secure resources by permanently altering the resources to include a watermark template that identifies and/or describes the resources as sensitive. This process may be implemented through a method that identifies resources, identifies watermark templates, associates the watermark templates with the resources, and authorizes user devices to perform actions on the resources. The watermark templates may include user information, device information, affiliated enterprise information, etc. that may assist in securing the resources were they to fall into the wrong hands. Examples may include statements of confidentiality and ownership, identities of users that shared the resources, the state of security settings on user devices that have accessed the resources, and/or the like. Once a watermark template is applied to a resource and/or once a user device performs an action on a resource with a watermark template, an event log may be created and distributed as necessary to support remote management of the respective resources and/or user devices. For example, the user device 100 may communicate an event log to one and/or more management servers affiliated with an enterprise that provides the user device 100 with access to resources that are associated with watermark templates.

FIG. 1 is a block diagram of a user device 100. User device 100 may comprise a processor 105 and a memory 110. For example, user device 100 may comprise a personal digital assistant, a smart phone, a cellular telephone, a desktop computer, a laptop computer, a set-top box, a music player, a web pad, a tablet computer system, a game console, and/or any other device with like capability. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by an operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Memory 110 may further comprise a data store 150, within which user device 100 may store a plurality of user device 100 files. User device 100 may, for instance, store in the data store 150 a device profile 152. Device profile 152 may comprise one or more indications of the state of user device 100. For instance, device profile 152 may represent device identifiers unique to user device 100, user identifiers and/or credentials associated with one or more users of user device 100, hardware features and/or components of user device 100, version and configuration information of various software features and applications installed on user device 100, data transmission protocols enabled on user device 100, version and usage information of various resources stored on user device 100, and/or any other attributes associated with the state of user device 100. The device profile 152 may further comprise data indicating a date of last virus scan of user device 100, a date of last access by an IT representative, a date of last service by the IT representative, and/or any other data indicating maintenance and usage of user device 100. Moreover, the device profile 152 may comprise indications of the past behavior of associated users, such as accesses to one or more resource 154, charges for such accesses, and the inventory accessed from such resources 154. Furthermore, device profile 152 may indicate a current location associated with user device 100 and/or a home location associated with user device 100. Similarly, device profile 152 may indicate a current time associated with user device 100 and/or a home time associated with user device 100, such as a time associated with a home location associated with user device 100. Device profile 152 may, for example, comprise data accessible to user device 100 via functions of user device 100, such as GPS location data, and/or via remote services communicatively coupled to user device 100, such as current time data provided by a remote time service.

User device 100 may also store at least one resource 154 in the data store 150. Resources 154, for instance, may include any electronic data, such as databases, applications, text files, word processor files, spreadsheet files, presentation files, graphic files, audio files, photographic files, video files, applications and application files, and/or the like. More specifically, resources 154 may include at least one of the following file types: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

User device 100 may further store at least one watermark template 156 in the data store 150. Watermark template 156 may include an arrangement of data and/or a file containing such arranged data. In some embodiments, a watermark template 156 may be associated with and/or applicable to one and/or more of the following: a resource 154, a user device 100, and a user of a user device 100. For example, an administrator of a watermark template server 220 may designate certain resources 154, user devices 100, and/or users of user devices 100 to be associated with a certain watermark template 156, as described herein. Additionally, a watermark template 156 may include data affiliated with and/or describing resources 154, user devices 100, and/or users of user devices 100 based on the watermark template 156 being associated with such resources 154, user devices 100, and/or users of user devices 100. As an example, a watermark template 156 may be associated with a user device 100 in response to the user device 100 creating a resource 154 that is associated with the watermark template 156. In such scenario, the watermark template 156 may include descriptive data related to the associated user device 100, for instance, specifying a device identifier of the associated user device 100 and an indication that such user device 100 created the resource 154 associated with the watermark template 156. As another example, a watermark template 156 may be associated with a user device 100 in response to the user device 100 requesting access to a resource 154 associated with the watermark template 156.

In some embodiments, a watermark template 156 may include a plurality of descriptive data, such as text, describing one or more resources 154, user devices 100, and/or users of user devices 100 associated with the watermark template 156. Descriptive data may include, for instance, one and/or more properties associated with such resources 154, properties associated with such user devices 100, user identifiers associated with such users of user devices 100, source identifiers associated with source user devices 100 and/or users of user devices 100, a timestamp associated with an action performed on such resources 154, and a location associated with an action performed on such resources 154. Properties associated with resources 154 may include, for instance, one and/or more prior actions taken on such resources 154, sensitivity levels of such resources 154, and/or security requirements associated with such resources 154, as described herein. Properties associated with user devices 100 may include, for example, one and/or more device identifiers, device hardware features, device software features, device applications, current times, current locations, and home locations associated with such user devices 100. For instance, descriptive data may include a listing of hardware features active and/or accessible on a user device 100 at the current time, a current location of the user device 100, and a home location of the user device 100, such as the geographic location of an enterprise providing the user device 100 with access to a resource 146 associated with the respective watermark template 156. Source user devices 100 and/or users of user devices 100 may include, for instance, user devices 100 and/or users of user devices 100 that provided the respective resource 154 to the user device 100 that is currently performing an action on the respective resource 154, such as storing the respective resource 154. As an example, a source user device 100 may be include a user identifier specifying a user of a user device 100 that emailed a resource 154 to another user of a user device 100.

In certain embodiments, a watermark template 156 may include descriptive data that is determined and/or identified at the time the watermark template 156 is to be utilized. In particular, a watermark template 156 may be dynamically composed such that the watermark template 156 includes dynamic descriptive data that is accurate at the time the watermark template 156 is viewed, applied, and/or otherwise used by a user device 100. In some embodiments, a watermark template 156 may acquire dynamic descriptive data with the assistance of a user device 100 communicatively coupled to the watermark template 156, such as via an agent application 250 and/or via an application programming interface as later described with respect to FIG. 2.

Dynamic descriptive data may include and/or describe, for example, a prior action type taken on a resource 154, such as a prior creation, prior access, prior modification, prior storage, and prior transmission of the resource 154 by a user device 100 and/or user of a user device 100. A transmission of a resource 154 may, for instance, include transmitting the resource 154 via a sharing feature, an email, an instant message, a text and/or multimedia message, a social media application, a FTP server, and/or other means of transmitting resources 154 between user devices 100. In some embodiments, a watermark template 156 may describe such prior actions by including descriptive data detailing one and/or more user identifiers, source identifiers, timestamps, locations, prior action types, contextual details describing such prior actions, a property associated with a user device 100 associated with such prior actions. Timestamps may, for instance, specify a date and/or time associated with the timestamp, such as the date and time when a resource 154 was shared by a certain user device 100, a date and time when the resource 154 was received from the sharing user device 100 by a recipient user device 100, a date and time when the recipient user device 100 will cease to be authorized to perform actions on the resource 154, and/or a date and time when the resource 154 will expire and/or become inaccessible by user devices 100. A timestamp may further, for example, specify the context of the timestamp so as to describe the context of such dates and/or times. Contextual details describing such prior actions may include, for example, whether the associated user device 100 complied with one and/or more compliance rules 158 associated with such prior actions, as described herein.

A watermark template 156 may further include descriptive data that is static and/or does not change with respect to a resource 154, user device 100, and/or user of a user device 100. In some embodiments, static descriptive data may be pre-configured by an administrator of a watermark template server 220, as described herein. Static descriptive data may, for instance, specify a sensitivity level associated with a certain resource 154 associated with the respective watermark template 156. Sensitivity levels associated with a resource 154 may specify that the resource 154 is one and/or more of the following: confidential, proprietary, privileged, and managed. For example, a resource 154 that contains financial data may be associated with both a confidential sensitivity level and a proprietary sensitivity level. A privileged sensitivity level may, for instance, indicate that the respective resource 154 is subject to and/or protected by an attorney-client relationship and/or the work product doctrine. A managed sensitivity level may, for example, indicate that the respective resource 154 is managed and/or controlled by a resource server 210, as described herein. More particularly, a managed sensitivity level may describe an enterprise and/or business that owns and/or controls the respective resource 154, which may also own and/or control a resource server 210 associated with and/or communicatively coupled to the respective resource 154. Static descriptive data may also, for instance, specify a security requirement associated with a certain resource 154 associated with the respective watermark template 156. Security requirements may specify, for instance, certain authorized and/or unauthorized user identities, device identities, device hardware features, device software features, device applications, action performance times and/or durations, and action performance locations. In other words, security requirements may specify positive and negative criteria required for a certain user device 100 to perform a certain action on a resource 154 associated with such security requirements. User identities and device identities may include user identifiers and device identifiers, respectively. In certain embodiments, security requirements are expressed and/or enforced via compliance rules 158 associated with one or more user devices 100 subject to the security requirements, as described herein.

In some embodiments, an administrator associated with a watermark template 156 may configure the watermark template 156 to include certain descriptive text in certain locations amongst the watermark template 156. As an example, a watermark template 156 associated with a resource 154 may be configured to position a title associated with the resource 154 in the upper left corner of the watermark template 156. The watermark template 156 may be further configured to position a current timestamp associated with an initial creation of the resource 154 in the upper right hand corner of the watermark template 156. The watermark template 156 may yet further be configured to position a device identifier associated with a user device 100 requesting to share and/or transmit an associated resource 165 in the lower left hand corner of the watermark template 156. The watermark template 156 may even yet further be configured to position a user identifier associated with a user of a user device 100 to whom an associated resource 156 is being shared in the lower right hand corner of the watermark template 156. Finally, the watermark template 156 may be configured to position a statement of confidentiality in translucent font diagonally across the length the watermark template 156, which may clearly identify a sensitivity level associated with the watermark template 156 and/or any associated resources 154.

In some embodiments, a watermark template 156 need not comprise a visible indicator. For example, an audio resource 154 may be associated with an audio watermark template 156 comprising a configurable message concatenated onto the audio resource 154 at the beginning of the existing audio, within the existing audio, and/or at the end of the existing audio of the audio resource 154. Additionally, an audio resource 154 may be associated with an audio watermark template 156 comprising an audio marker that may be heard concurrently with the existing audio of the audio resource 154. Such an audio watermark may comprise a spoken audio and/or a non-spoken audio, such as a public domain, trademarked and/or copyrighted musical selection associated with an enterprise associated with the watermark template 156.

In some embodiments, a user device 100 may associate and/or unite a watermark template 156 with a resource 154. In particular, a watermark template 156 may be overlaid and/or superimposed onto a resource 154, such that the watermark template 156 and the resource 154 are united when viewed by a human being. For example, a resource 154 may be modified such that a plurality of descriptive text of a watermark template 156 may be visible on the resource 154. Furthermore, the resource 154 may appear largely the same as before the watermark template 156 is overlaid and/or superimposed onto the resource 154, as the watermark template 156 may include a translucent body and/or background that may allow the underlying resource 154 to remain visible amongst the plurality of descriptive text of the watermark template 156. In certain embodiments, a resource 154 may be marked and/or badged with "Watermarked" and/or the like to indicate that the resource 154 is associated with a watermark template 156. Similarly, a resource 154 may be marked and/or badged with indicia of an action that triggered a watermark template 156 to become associated with such resource 154 in accordance with a compliance rule 158 associated with the resource 154 and/or user device 100, such as by placing a diagonal badge across the upper left corner of an icon of the resource 154 stating "Shared" to indicate that the resource 154 was watermarked in response the resource 154 being shared with another user device. For instance, a resource 154 may be marked and/or badged on the icon representing the resource 154 in the finder and/or desktop of the user device 100.

In some embodiments, the manner of which a user device 100 associates a watermark template 156 with a resource 154 may be based at least in part on the type of resource 154 that will be associated with the watermark template 156. For example, an image resource 154 may have a watermark template 156 superimposed on the image resource 154 such that the watermark template 156 and the underlying image are concurrently visible, as described herein. As another example, an email resource 154 may have a watermark template 156 displayed as an overlay and/or underlay to the email resource 154 and/or the watermark template 156 may be included as a header and/or signature to the email resource 154. As a further example, a word processing, spreadsheet and/or presentation ("productivity") resource 154 may comprise a watermark template 156 in one and/or more of the following: displayer in a header and/or footer section of the productivity resource 154, incorporated as visible and/or non-visible metadata in the productivity resource 156, and/or displayed as an overlay, underlay, and/or adjacent image to at least a portion of the content of the productivity resource 156. For instance, metadata may be incorporated in a resource 154 by one and/or more of attaching the metadata to the resource 154 and placing the metadata in a header of the resource 154 with locked editing. In some embodiments, a watermark template 154 may be repeated so as to be visible and/or affixed in at least one of the above manners on each page, slide, worksheet, etc. of the productivity resource 154.

In certain embodiments, a watermark template 156 may be permanently associated and/or united with a resource 154. For example, a resource 165 may be permanently modified such that descriptive text of a watermark template 156 cannot be removed from the resource 156. Furthermore, a series of watermark templates 156 may be associated with a resource 154 over the lifespan of the resource 154, such that a watermark template 156 is associated with a resource 154 with one or more previously associated watermark templates 156. For instance, watermark templates 156 may be associated with resources 154 according to a plurality of compliance rules 158, as described herein, such that a watermark template 156 is associated with the resources 154 upon certain actions being taken with respect to the resources 154. More specifically, a watermark template 156 may be associated with a resource 154 each time a user device 100 seeks to share the resource 154, where the associated watermark template 156 may be dynamically populated based on a current context, such as a current location, a current timestamp or a device identifier associated with the sharing functionality request.

In certain instances, it may be determined whether any changes have occurred to a resource 154 before a new watermark template 156 is applied to the resource 154 with previously associated watermark templates 156. For example, it may be determined whether a resource 154 needs a new watermark template 156 applied based at least in part on one and/or more of OCR'ing the resource 154 to determining whether the resource 154 has changed since the last version and comparing a watermark template 156 comprising a hash/checksum of the OCR'd text to determine whether the resource 154 was altered, annotated and/or otherwise modified.

Some descriptive data included in a watermark template 156 may be static, such as the title of a resource 154 and a current timestamp associated with an initial creation of the resource 154, and may, therefore, remain the same each time the watermark template 156 is associated with a resource 154. However, some descriptive data included in a watermark template 156 may be dynamic, such as a property associated with a resource 154 and a property associated with a user device 100, and may, therefore, update each time the watermark template 156 is associated with a resource 154. For instance, the watermark template 156 may be updated upon each association with a resource 154 based at least in part on a device profile 152 and/or a resource 154. In some embodiments, a resource 154 may be associated with all watermark templates 156 previously associated with the resource 154, such that all descriptive text associated with the resource 154 over the lifespan of the resource 154 is included in the current version of the resource 154. In particular, a resource 154 may be layered with many watermark templates 156 and may thereby provide a history of the resource 154. For instance, a resource 154 may include descriptive data of a first watermark template 156 after the first watermark template 156 is associated with the resource 154, the resource 154 may include descriptive data of the first watermark template 156 and descriptive data of a second watermark template 154 after the second watermark template 156 is associated with the resource 154, and so on. Alternatively, in some embodiments, a resource 154 may only be associated with a newly associated watermark template 156, thereby removing any previously associated watermark templates 156 from the resource 154.

Moreover, user device 100 may store one or more compliance rules 158. Compliance rules 158 may be associated with one and/or more of certain user devices 100, certain users of user devices 100, and certain resources 154. For instance, compliance rules 158 may be associated with certain resources 154 when certain users of certain user devices 100 request and/or initiate certain actions on such resources 154, such as when a certain employee using a certain tablet seeks to email certain documents to certain recipients that are not affiliated with the respective enterprise. Compliance rules 158 may be associated with such user devices 100, users of user devices 100, and/or resources 154 by an administrator of a compliance rule server 230, as described herein.

Compliance rules 158 may specify security requirements, conditions and/or events required for user device 100 to perform certain functions on user device 100. In some embodiments, compliance rules 158 may specify certain methods and/or steps of methods that must be performed before a user device 100 is authorized to perform certain actions on certain resources 154 accessible to certain user devices 100. In particular, compliance rules 158 may specify that certain resources 154 must be associated and/or united with certain watermark templates 156 before certain user devices 100 may be authorized to perform certain actions on certain resources 154 accessible to such user devices 100, as described herein. Additionally, in certain embodiments, compliance rules 158 may specify that certain resources 154, such as those associated with a request to share such resources 154, may only be accessed and/or transmitted by certain applications, such as a containerized application capable of receiving and/or rending the resources 154 in a secure environment. Such an embodiment may be effectuated, for instance, by compliance rules 158 specifying that such resource 154 must be one and/or more of encrypted, associated with certain metadata, and/or associated with certain file extensions to restrict a user device 100 from performing certain actions on the resources 154 outside of a containerized application capable of interpreting such encryption, metadata, and/or file extensions.

In some embodiments, compliance rules 158 may specify that user device 100 must satisfy and/or comply with a single condition for user device 100 to be authorized to perform certain functions of user device 100 associated with the compliance rules 158. For instance, compliance rules 158 may require that user device 100 is associated with a current time that is within an authorized time period specified by such compliance rules 158 in order for user device 100 to be authorized to take certain actions on certain resources 154 accessible to user device 100. More specifically, compliance rules 158 may specify that user device 100 is authorized to share a business email resource 154, such as by email, while the system clock of user device 100 is within a configured workday and user device 100 is not authorized to access the business email resource 154 while the system clock of user device 100 is outside of the configured workday. In some embodiments, compliance rules 158 may specify that user device 100 must satisfy and/or comply with more than one condition for user device 100 to be authorized to perform certain actions on resources 154 accessible to user device 100. For example, compliance rules 156 may specify that user device 100 must be associated with a "safe zone" location, such as an enterprise office location, to upload certain sensitive resources 154 accessible to user device 100, such as those affiliated with an enterprise, which may require that both a GPS sensor of user device 100 indicates that user device 100 is currently located within the geographic boundaries of the safe zone and that a Wi-Fi sensor of user device 100 indicates that user device 100 is communicatively coupled to a Wi-Fi network access point associated with the safe zone.

In some embodiments, compliance rules 158 may specify that user device 100 and another computing device, such as another user device 100, must both satisfy and/or comply with one or more conditions for user device 100 to be authorized to perform certain functions of user device 100 associated with the compliance rules 158. Compliance rules 158 may require that user device 100 be located within proximity of and/or be communicatively coupled to a secondary user device 100 and that both user devices 100 be located within an authorized location in order to perform certain actions on certain resources 154 accessible to user device 100. As an example, compliance rules 158 may specify that user devices 100 associated with nurses may only view resources 154 associated with their patients, such as a patient's medical records, while the user devices 100 associated with such nurses are located within 10 feet of user devices 100 associated with such patients and while the user devices 100 associated with nurses and user devices 100 associated with patients are both located within examination rooms specific to such patients' appointments.

In some embodiments, compliance rules 158 may be granular such that user device 100 may be authorized to perform certain actions on certain resources 154 depending on how many of the conditions of the compliance rules 158 are satisfied by user device 100. For example, user device 100 may be authorized to access an enterprise contact resource 154 on user device 100 if a GPS sensor on user device 100 indicates that user device 100 is located within the enterprise's location, but user device 100 may be prohibited from sending an email with an enterprise resource 154 attached until a watermark template 156 associated with the enterprise resource 154 is associated with and/or affixed to the enterprise resource 154 and until it is confirmed that user device 100 is located within a "safe zone" by being communicatively coupled to a Wi-Fi network access point associated with the enterprise.

An agent application 250 ("agent app") on user device 100 may determine whether compliance rules 158 are satisfied, as described herein. For instance, agent application 250 may determine whether user device 100 complies with certain compliance rules 158 by determining whether device profile 152 provides indications that user device 100 complies with such compliance rules 156. As an example, agent application 250 may determine whether device profile 152 specifies that the current time associated with user device 100 is within a configured workday specified by compliance rules 158. Alternatively, user device 100 may transmit all and/or a portion of device profile 152 to a compliance server 230 that may determine whether user device 100 satisfies compliance rules 156, as described herein. In any case, user device 100 may be authorized and/or instructed to perform functions of user device 100, such as performing certain actions on certain resources 154 accessible to user device 100, response to a determination that user device 100 complies with compliance rules 158. In certain embodiments, an agent application 250 may authorize the device to perform such actions by calling the operating system 115 of user device 100 and/or communicating with such operating system 115 via an API and/or SDK.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

Figure 2:
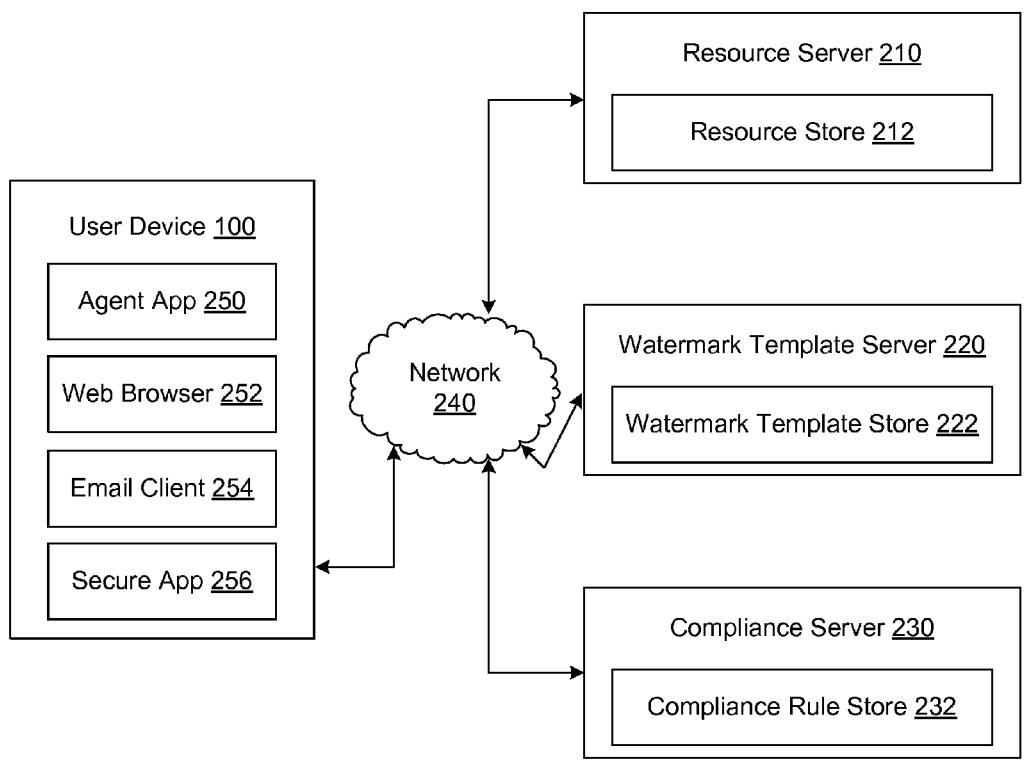
FIG. 2 is a block diagram of an operating environment.

FIG. 2 is a block diagram view of an operating environment 200 showing other elements operating with the user device 100, such as a network 240, resource server 210, watermark template server 220, and compliance server 230. In some embodiments, the user device 100 may include and/or execute one and/or more of the following: an agent app 250, a web browser 252, an email client 254, and a secure application 256. The agent app 250 may comprise, for instance, an application communicatively coupled to one and/or more of the resource server 210, watermark template server 220, and compliance server 230 so as to enable such servers to instruct the user device 100 to perform certain actions on the user device 100, such as take certain actions on certain resources 154, associated certain watermark templates 156 with certain resources 154, and conform its operations to certain configuration profiles 158. The web browser 252 may comprise, for example, an application communicatively coupled to the network 240 that is capable of one and/or more of the following: viewing websites, downloading resources from web servers, uploading resources to web servers, executing web applications, and/or the like. The email client 254 may comprise, for instance, an application communicatively coupled to the network 240 that is capable of sending email resources 154, receiving email resources 154, scheduling calendar resources 154, storing contact resources 154 and/or other operations provided by personal information managers ("PIM's"). Furthermore, the secure app 256 may comprise, for instance, a containerized resource application that is capable of receiving resources 154, storing the resources 154 within the container to protect the resources 154 from access attempts by other applications on the user device 100, and provide access to the resources 154 in accordance with and/or in compliance with compliance rules 158 associated with the resources 154. In certain embodiments, the agent app 250, web browser 252, email client 254, and secure app 256 may be configured to create event logs by monitoring each application's operations with respect to the resources 154, watermark templates 156, and compliance rules 158 detailed by the event log, including actions taken on the resources 154, associations and/or changes to watermark templates 156 over the lifespan on the resources 154, and the user devices' 100 compliance with the compliance rules 158. The agent app 250, web browser 252, email client 254, and secure app 256 may be further configured to transmit the event logs to one and/or more of the resource server 210, watermark template server 220, and compliance server 230, which may be utilized by each server in its execution of management systems and/or applications associated with the user device 100.

In some embodiments, the user device 100 may be communicatively coupled to the resource server 210, watermark template server 220, and compliance server 230 via the network 240. The network 240 may include, for instance, a cellular network, Wi-Fi network, Bluetooth network, and/or any other network capable of transmitting data between and/or amongst user device 100, resource server 210, watermark template server 220, and compliance server 230. While the resource server 210, the watermark template server 220, and the compliance server 230 are represented as separate elements amongst operating environment 200, it is understood that such servers could be combined into a single server capable of performing the same and/or similar functionality that each of the resource server 210, the watermark template server 220, and the compliance server 230 may be capable of performing separately, such as executing a management system and/or application.

In some embodiments, the resource server 210 may comprise a server that manages a plurality of resources 154, such as resources 154 associated with an enterprise. The resource server 210 may include a resource store 212, which may store such resources 154. The resource server 210 may transmit resources 154 to the user device 100 and may receive transmissions of resources 154 from the user device 100 via the network 240. The resource server 210 may be associated with the user device 100, for instance, by enrolling the user device 100 into a management system and/or application executed by resource server 210. More specifically, resource server 210 may distribute certain settings and/or configuration profiles to the user device 100 that enables resource server 210 to instruct user device 100 to perform certain actions, such as instructing user device 100 to download certain resources 154 from resource store 212 of resource server 210. The resource server 210 may also track and/or manage the usage of resources 154 associated with the resource server 210, such as by receiving and/or logging event logs transmitted by user device 100 describing the usage of the resources 154. The event logs may include and/or describe usage of the resource 154 by detailing, for instance, a device identifier associated with a user device 100, a user identifier associated with a user of a user device 100, a resource 154, a watermark template 156 associated with a resource 154, an request to perform an action on a resource 154, an action performed on a resource 154, and/or the like.

In some embodiments, the watermark template server 220 may comprise a server that manages a plurality of watermark templates 156, such watermark templates 156 associated with resources 154 associated with an enterprise. The watermark template server 220 may include a watermark template store 222, which may store such watermark templates 156. The watermark template server 220 may transmit watermark templates 156 to the user device 100 and may receive transmissions of resources 154 with watermark templates 156 associated and/or affixed to the resources 154 from the user device 100 via the network 240. The watermark template server 220 may be associated with the user device 100, for instance, by enrolling the user device 100 into a management system and/or application executed by watermark template server 220. More specifically, watermark template server 220 may distribute certain settings and/or configuration profiles to the user device 100 that enables watermark template server 220 to instruct user device 100 to perform certain actions, such as instructing user device 100 to download certain watermark templates 156 from watermark template store 222 of watermark template server 220 and/or to associate certain watermark templates 156 with certain resources 154 accessible to the user device 100. The watermark template server 220 may also track and/or manage the usage of watermark templates 156 associated with the watermark template server 220, such as by receiving and/or logging event logs transmitted by user device 100 describing the usage of the watermark templates 156. The event logs may include and/or describe usage of the watermark templates 156 by detailing, for instance, a device identifier associated with a user device 100, a user identifier associated with a user of a user device 100, a resource 154, a watermark template 156 associated with a resource 154, an request to perform an action on a resource 154 and/or watermark template 156, an action performed on a resource 154 and/or watermark template 156, and/or the like.

In some embodiments, the compliance server 230 may comprise a server that manages a plurality of compliance rules 158, such compliance rules 158 associated with resources 154 and/or watermark templates 156 associated with an enterprise. The compliance server 230 may include a compliance rule store 232, which may store such compliance rules 158. The compliance server 230 may transmit compliance rules 156 to the user device 100 and may receive transmissions of compliance audits and/or device profiles 152 that may be used to determine whether the user device 100 complies with compliance rules 158 from the user device 100 via the network 240. The compliance server 230 may be associated with the user device 100, for instance, by enrolling the user device 100 into a management system and/or application executed by compliance server 230. More specifically, compliance server 230 may distribute certain settings and/or configuration profiles to the user device 100 that enables compliance server 230 to instruct the user device 100 to perform certain actions, such as instructing the agent application 250 on the user device 100 to determine whether the user device 100 complies with certain compliance rules 158 based on the device profile 152 associated with the user device 100. The compliance server 230 may also track and/or manage the usage of compliance rules 158 associated with the compliance server 320, such as by receiving and/or logging event logs transmitted by user device 100 describing the compliance of the user device 100 with the compliance rules 158.

Figure 3:
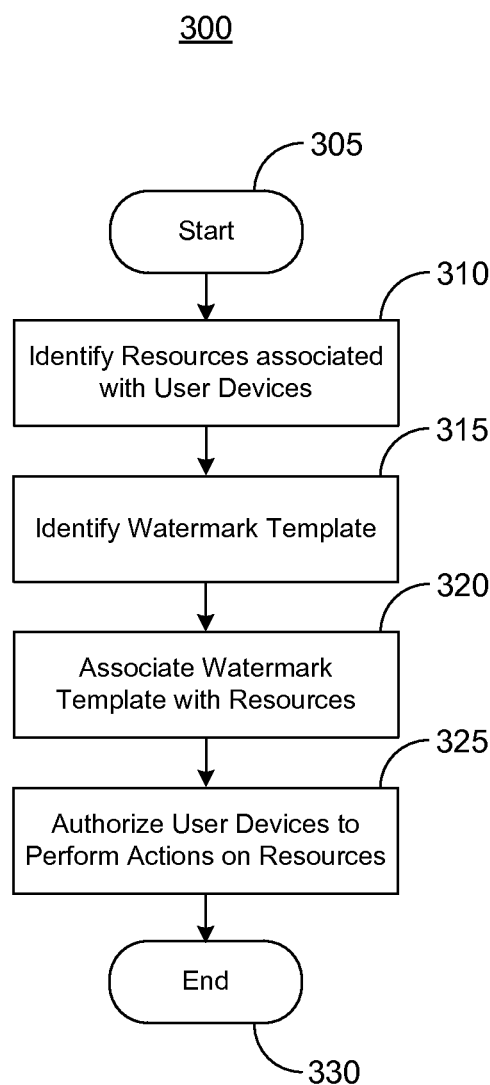
FIG. 3 is a flow chart illustrating a method for providing resource watermarking and management.

FIG. 3 is a flow chart setting forth the general stages involved in a method 300 consistent with embodiments of this disclosure for providing resource watermarking and management. Method 300 may be implemented using element(s) of operating environment 200, such as user device 100, resource server 210, watermark template server 220, compliance server 230, and network 240, as described above. Ways to implement the stages of method 300 will be described in greater detail below.

Method 300 may begin at starting block 305 and proceed to stage 310 where at least one resource 154 associated with a user device 100 is identified. In some embodiments, resources 154 may be associated with a user device 100 based on the commonality of ownership of the user device 100 and the resources 154 by an enterprise and/or the affiliation of a user of the user device 100 with an enterprise that is also affiliated with the resources 165. In certain embodiments, an administrator of a resource server 210 may associate a user device 100 with certain resources 154, such as resources 154 that the user of the user device 100 is authorized to access based on her employment with an enterprise associated with the resources 154. As an example, the data store 150 of the user device 100 may be searched and/or queried to identify resources 154 associated with the user device 100. As another example, a resource store 212 within a resource server 210 communicatively coupled with the user device 100 may be searched and/or queried to identify resources 154 associated with the user device 100.

From stage 310, method 300 may advance to stage 315 where at least one watermark template 156 is identified. In certain embodiments, watermark templates 156 associated with one and/or more of the user device 100, a user of the user device 100, and the identified resources 154 may be identified. In some embodiments, an administrator of a watermark template server 220 may associate a watermark template 156 with certain user devices 100, users of user devices 100, and/or resources 154 based at least in part on the respective users employment with an enterprise associated with the watermark template 156. As an example, the data store 150 of the user device 100 may be searched and/or queried to identify watermark templates 156. As another example, a watermark template store 222 within a resource server 220 communicatively coupled with the user device 100 may be searched and/or queried to identify watermark templates 156.

From stage 315, method 300 may advance to stage 320 where the identified watermark templates 156 are associated with the identified resources 154. In some embodiments, the watermark templates 156 are associated with the resources 154 by overlaying the watermark templates 156 onto the resources 154, such that the resources 154 are permanently united with the watermark templates 156. In certain embodiments, the watermark templates 156 are associated with the resources 154 by placing the watermark templates 156 in various locations on the resources 154 over the lifespan of the resources 154 according to a pre-defined placement algorithm and/or sequence such that multiple watermark templates 156 may be visible on a single resource 154 once the resource 154 has more than a single watermark template 156 associated with such resource 154. In some embodiments, the watermark templates 156 may be configured to be associated with the resources 154 in a least-intrusive manner, such that the watermark template does not obscure the underlying text and/or imagery of the resources 154.

From stage 320, method 300 may advance to stage 325 where the user device 100 is authorized to perform certain actions on the resources 154. In some embodiments, the user device 100 may be authorized to perform certain actions on certain resources 154 in accordance with certain applicable compliance rules 158 once the watermark templates 156 are associated with such resources 154. As an example, the user device 100 may be authorized to create a resource 154, access a resource 154, share a resource 154, store a resource 154, and/or otherwise transmit a resource 154 once the resource 154 has been associated with the appropriate watermark template 158. In some embodiments, the user device 100 may first determine whether the action is authorized according to compliance rules 158. As an example, an agent application 250 on the user device 100 may determine whether the device profile 152 satisfies certain compliance rules 156 before authorizing the operating system 115 of the user device 100 to perform certain actions on the resources 154. Additionally, the user device 100 may create an event log describing the authorization and/or the action performed and transmit such event log to one and/or more of the resource server 210, watermark template server 220, and compliance server 230. Method 300 may then end at stage 330.

An embodiment consistent with the disclosure may comprise a system for providing resource watermarking and management. The system may comprise a memory storage and a processing unit coupled to the memory storage. The processing unit may be operative to identify at least one resource associated with a device, identify at least one watermark template, associate said watermark template with said at least one resource, and authorize said device to perform at least one action on said at least one resource.

Another embodiment consistent with the disclosure may comprise a system for providing resource watermarking and management. The system may comprise a memory storage and a processing unit coupled to the memory storage. The processing unit may be operative to identify at least one resource associated with a device, identify at least one watermark template, associate said watermark template with said at least one resource, and authorize said device to perform at least one action on said at least one resource.

Yet another embodiment consistent with the disclosure may comprise a system for providing resource watermarking and management. The system may comprise a memory storage and a processing unit coupled to the memory storage. The processing unit may be operative identify at least one resource associated with a device, identify at least one watermark template, associate said watermark template with said at least one resource, and authorize said device to perform at least one action on said at least one resource.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    enrolling a user device with a management system that manages the user device for an enterprise;
    generating, using the user device, a device profile that comprises first descriptive data describing the user device at a first instance in time;
    obtaining, in the user device, a configuration profile that causes the user device to at least obtain at least one watermark template from the management system, wherein the configuration profile further causes the user device to at least comply with at least one compliance rule;
    identifying, using the user device, a request to access at least one resource;
    determining, using the user device, whether the at least one compliance rule specifies that the at least one resource is required to be associated with at least one watermark template in order for the user device to be authorized to access the at least one resource;
    determining, using the user device, whether the at least one watermark template is associated with the at least one resource;
    associating, using the user device, the at least one watermark template with the at least one resource in response to determining that the at least one watermark template is not associated with the at least one resource; and
    adding, using the user device, the first descriptive data from the device profile to the at least one watermark template associated with the at least one resource;
    updating, using the user device, the device profile with second descriptive data describing the user device at a second instance in time; and
    adding, using the user device, the second descriptive data from the device profile to the at least one watermark template associated with the at least one resource.

2. The method of claim 1, further comprising:
    causing, using the user device, at least one event log to be created, the at least one event log describing an association of the at least one watermark template to the at least one resource.

3. The method of claim 2, further comprising:
    causing, using the user device, the at least one event log to be transmitted to at least one management service communicatively coupled to the user device.

4. The method of claim 1, further comprising:
    causing, using the user device, the request to access the at least one resource to be authorized when the at least one compliance rule is satisfied.

5. The method of claim 4, further comprising:
causing, using the user device, at least one event log to be created, the at least one event log describing an authorization of the request to access the at least one resource.

6. The method of claim 5, further comprising:
causing, using the user device, the at least one event log to be transmitted to at least one management service communicatively coupled to the user device.

7. The method of claim 1, further comprising:
causing, using the user device, the request to access the at least one resource to be denied when the at least one compliance rule is not satisfied.

8. The method of claim 1, wherein at least a portion of the first descriptive data describing the user device is acquired from an application executed by the user device.

9. The method of claim 1, wherein at least a portion of the first descriptive data describing the user device is acquired from a management service communicatively coupled to the user device.

10. The method of claim 1, wherein the at least one resource is stored by a resource server communicatively coupled to the user device.

11. The method of claim 1, wherein the at least one watermark template is stored by a watermark template server communicatively coupled to the user device.

12. The method of claim 1, further comprising:
performing a compliance audit of the user device; and
transmitting a report of the compliance audit to the management system.

13. An apparatus comprising:
at least one processor; and
at least one memory accessible to the at least one processor, the at least one memory storing a plurality of compliance rules used to enforce a plurality of security requirements, the at least one memory further storing a plurality of program code instructions that, when executed by the at least one processor, direct the at least one processor to at least:
 enroll a user device with a management system that manages the user device for an enterprise;
 generate a device profile file that comprises first descriptive data describing the user device at a first instance in time;
 obtain a configuration profile that causes the user device to at least obtain at least one watermark template from the management system, wherein the configuration profile further causes the user device to at least comply with at least one compliance rule;
 identify a request to access at least one resource;
 determine whether at least one of the compliance rules specifies that the at least one resource is required to be associated with at least one watermark template in order for the at least one processor to be authorized to access the at least one resource;
 determine whether the at least one watermark template is associated with the at least one resource;
 associate the at least one watermark template with the at least one resource in response to determining that the at least one watermark template is not associated with the at least one resource; and
 add the first descriptive data from the device profile to the at least one watermark template associated with the at least one resource;
 update the device profile with second descriptive data describing the user device at a second instance in time; and
 add the second descriptive data from the device profile to the at least one watermark template associated with the at least one resource.

14. The apparatus of claim 13, wherein the at least one of the compliance rules further specifies that the at least one processor is required to be located within a predefined geographic location in order for the at least one processor to be authorized to access the at least one resource.

15. The apparatus of claim 13, wherein the at least one of the compliance rules further specifies that the at least one processor is required to be communicatively coupled to a predefined access point in order for the at least one processor to be authorized to access the at least one resource.

16. The apparatus of claim 13, wherein the at least one of the compliance rules further specifies that a plurality of conditions are required to be satisfied in order for the at least one processor to be authorized to access the at least one resource.

17. The apparatus of claim 13, wherein the plurality of program code instructions further direct the at least one processor to at least:
perform a compliance audit of the user device; and
transmit a report of the compliance audit to the management system.

18. A computer program product comprising a non-transitory computer-readable storage medium having a plurality of program code portions embodied therein, the program code portions being configured to, upon execution, direct at least one computing device to at least:
 enroll a user device with a management system that manages the user device for an enterprise;
 generate a device profile that comprises first descriptive data describing the user device at a first instance in time;
 obtain a configuration profile that causes the user device to at least obtain at least one watermark template from the management system, wherein the configuration profile further causes the user device to at least comply with the at least one compliance rule;
 identify a request to access at least one resource;
 determine whether at least one compliance rule specifies that the at least one resource is required to be associated with at least one watermark template in order for the at least one resource to be accessible;
 determine whether the at least one watermark template is associated with the at least one resource;
 associate the at least one watermark template with the at least one resource in response to determining that the at least one watermark template is not associated with the at least one resource; and
 add the first descriptive data from the device profile to the at least one watermark template associated with the at least one resource;
 update the device profile with second descriptive data describing the user device at a second instance in time; and
 add the second descriptive data from the device profile to the at least one watermark template associated with the at least one resource.

19. The computer program product of claim 18, wherein the program code portions further direct the at least one computing device to at least:
perform a compliance audit of the user device; and
transmit a report of the compliance audit to the management system.

* * * * *